Jan. 13, 1942.   L. G. MORTEN   2,269,779
ELECTRICITY CONDUCTOR UNIT
Filed Jan. 6, 1940
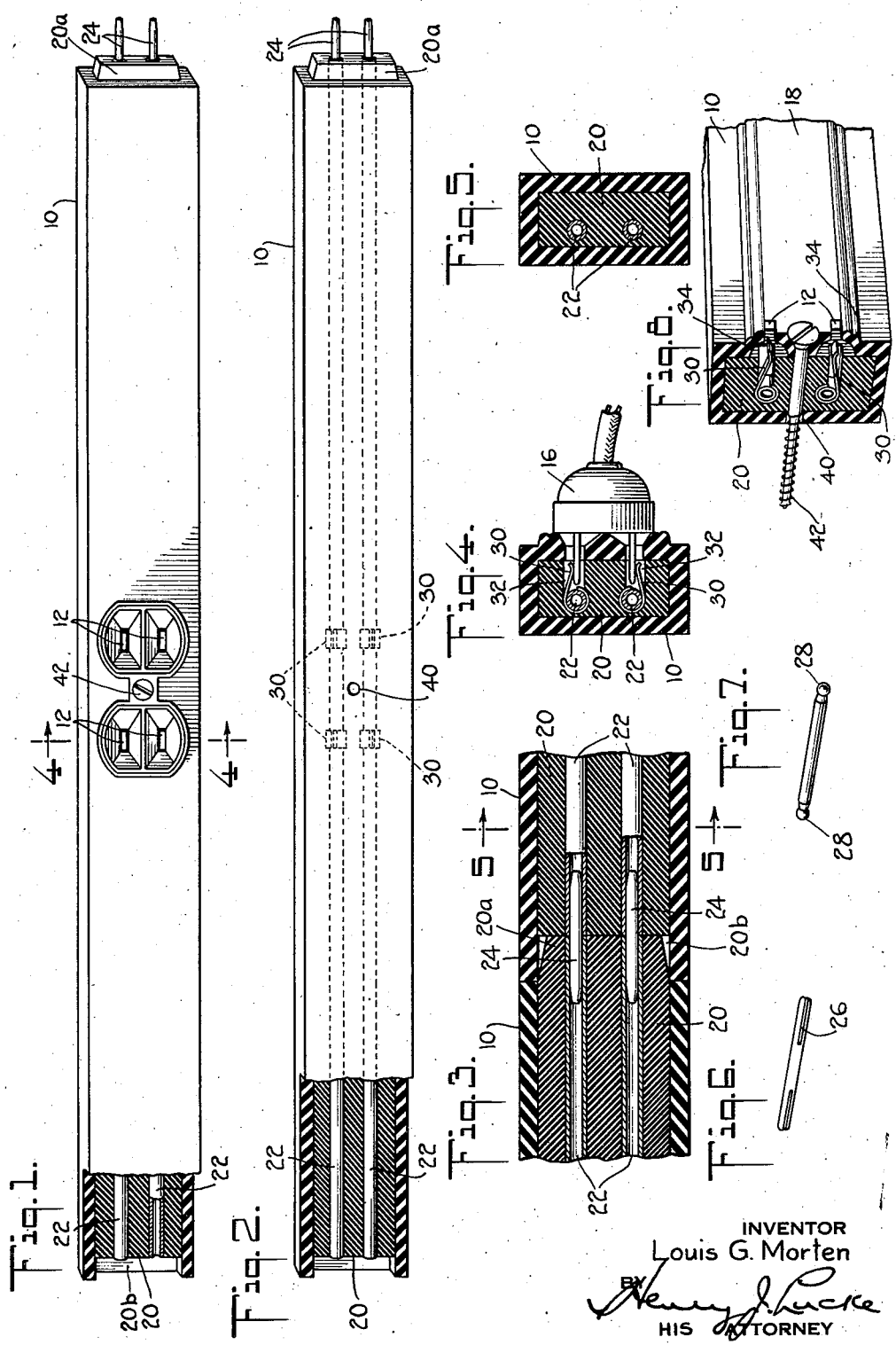
INVENTOR
Louis G. Morten
HIS ATTORNEY Patented Jan. 13, 1942

2,269,779

UNITED STATES PATENT OFFICE 2,269,779

ELECTRICITY CONDUCTOR UNIT

Louis G. Morten, Teaneck, N. J., assignor to John B. Pierce Foundation, New York, N. Y., a corporation of New York Application January 6, 1940, Serial No. 312,633

1 Claim. (Cl. 173—334.1)

The present invention relates to electricity conductor units, and particularly to electricity conductor units of standardized length suitable for seriatim mechanical and electrical interconnection to form a wiring circuit which may be installed in an exposed location, such as at the baseboard of a room, or the like.

It is an object of the present invention to provide an electricity conductor unit embodying a standardized insert of electrical insulation material, said insert having positioned therein, spaced electricity conductors. The insert is arranged to be slidably inserted into an outer shell, also preferably of electrical insulation material, and having any desired configuration, such as in simulation of base molding or the like.

It is a further object of the present invention to provide a composite electricity conductor unit comprising an open-ended outer shell and a conductor-bearing insert therefor, the said insert being slidably housed within the outer shell and offset therein to provide a socket portion at one end of the composite conductor unit and a male projection portion at the opposite end thereof.

It is a further object of the present invention to provide a composite electricity conductor unit available for use as an outlet-provided unit, the outer shell thereof providing for the slidable passage of the conductor bearing insert thereinto without conflict of the outlet contact means of such insert with the wall surface of the outer shell.

It is a further object of the present invention to provide a composite electrical unit, aforesaid, the conductor-bearing insert of which is provided with electric contact means available for connection with the blades of a conventional outlet plug.

In the present invention, the outer shell is desirably formed wholly of electrical insulation material, such as a molded plastic or the like, and in its preferred form is of the nature of a hollow tube having desirably planar inner wall surfaces. Such outer shell may, if desired, be provided with suitable openings arranged to accommodate the blades of a conventional outlet plug, or may have imperforate walls.

For operative association with such outer shell, I provide an insert section also desirably wholly of electrical insulation material, within which insert section are disposed electricity conductors, preferably tubular. Such conductors are maintained in predetermined spaced relationship and mutually insulated status, by the mass of insulation material of the insert section, which material may, if desired, substantially wholly envelop the conductors, and extend as an integral mass from conductor to conductor.

The configuration of such insert section desirably matches the inner configuration of the hollow outer shell portion, and is of suitable dimension to pass slidably into the outer shell portion. The engagement of the walls of the insert section with the walls of the outer shell assures uniformity of assembly of the composite electricity conductor unit, and uniform positioning of the conductors thereof with respect to the outer shell.

For use with the outlet-provided conductor unit, the conductors of the insert section may be provided with spring contact means, suitably spaced and positioned to register with the openings provided in the outer shell.

To permit the slidable insertion of the insert section into the outer shell portion without conflict of the spring contact means with the wall surface of the outer shell portion, the contact means may terminate substantially flush with the outer surface of the core means, or, alternatively, the outer shell may be provided with suitable grooves or "tracks" on the under surface of the wall containing such outlet openings.

It is also within the scope of the present invention to standardize the insert sections by providing such sections with suitably positioned spring contact means, the ends of which terminate substantially flush with the surface of the insert section. In such construction, the standardized insert may be used with facility with an outer shell having a wholly imperforate surface, as well as with an outer shell embodying connector plug insertion means. It will be obvious that when such standardized insert section is employed in connection with an imperforate outer shell, the spring contact elements thereof lie dormant within the shell, and are wholly and completely electrically insulated by reason of the electrical insulation character of the insert section body material and the outer shell material.

The preferably tubular conductors of the electricity conductor units provide for the electrical interconnection of conductors of contiguous units by the use of electricity conductive pins or the like. My improved conductor unit, therefore, may be assembled at the place of installation by connecting, in seriatim, individual conductor units, electrically conductive pins affording the electrical connection. By providing the conductor units with the socket and projecting end portions, aforesaid, the serially assembled units may be joined in a manner affording full protection and electrical insulation at the joints.

The present invention is a continuation, in part, of my presently co-pending application Serial No. 704,189, entitled Electricity conductor units, filed December 27, 1933, which matured into Patent No. 2,218,545, issued Oct. 22, 1940.

Other features and advantages will hereinafter appear.

In the accompanying drawing:

Fig. 1 is a perspective of an electricity conductor unit, a portion of which has been broken away to illustrate the interior construction thereof; such conductor unit is provided with electrical outlet means;

Fig. 2 is a similar perspective view of a second form of conductor unit, such conductor unit being a "blank" unit having imperforate wall surfaces;

Fig. 3 is an enlarged horizontal section of two conductor units connected in seriatim, said figure illustrating the male and female interconnection of contiguous units, and the employment of electrically conductive pins for effecting the electrical connection of the respective conductor means;

Fig. 4 is a section taken on the lines 4—4 of Fig. 1, additionally showing a conventional electrical attachment plug in operative position;

Fig. 5 is a transverse section of a conductor unit, specifically taken on the lines 5—5 of Fig. 3;

Figs. 6 and 7 show forms of electrically conductive pin means suitable for effecting the electrical interconnection of the conductors of adjacent conductor units; and Fig. 8 is a perspective of a second form of outlet-provided conductor unit, said figure illustrating the groove means wherein the terminal ends of the spring contacts of the insert section are accommodated.

Referring to the drawing, my improved electricity conductor unit preferably comprises an outer shell 10, desirably wholly of electrical insulation material, and most preferably made from moldable electrical insulation material such as moldable plastic or the like. As shown in Figures 5 and 8, outer shell 10 is desirably in the form of a hollow body, the interior wall faces of which are smooth and regular, and preferably substantially planar.

Such outer shell 10 may be "blank," that is, formed with imperforate wall surfaces, as indicated in Figure 2, or may be provided with suitable openings 12, 12 affording means for the insertion of an electric attachment plug 16, as shown in Figures 1 and 4.

The wall surfaces at which such perforations are applied may be configurated in any desired manner; the illustration in Figure 1 shows a conventional raised wall structure outlining the stated openings 12. In Figure 8 it is noted that the outer shell 10 has a smooth surfaced longitudinal rib 18, such rib 18 being provided with the illustrated openings 12.

For operative association with such outer shell 10, there is provided an insert section 20, desirably wholly of electrical insulation material, such as soft rubber or like substance capable of extrusion and/or molding, within which insert section 20 are positioned spaced electricity conductors 22, 22, preferably tubular in form. Such conductors are co-extensive with the insert section. As shown in Figure 5, the body material of such insert section desirably wholly embraces the electricity conductors 22, and extends, as an integral mass, around and between such conductors. The stated electricity conductors, therefore, are permanently secured within said insert section, and it is readily understood that by proper manufacturing control, the conductor means in conductor units are always uniformly spaced and adapted to seriatim electrical connection.

Preferably, insert section 20 has an outer configuration matching the internal configuration of the shell 10, and most preferably, the outer dimensions of the insert section 20 are such as to permit a snug, slidable fit within the shell 10, whereupon the principal surfaces of the insert section are in engagement with the principal inner wall surfaces of the shell 10.

In this manner, the inserts and shells may be made separately, and standardized conductor units formed by slidably inserting the insert sections within the shell units.

As illustrated in Figures 1 through 3, the insert sections are of the same length as the shell portions, but the inserts are so disposed with relation to the shell portions as to afford an offset, in which an end 20a of the insert section projects suitably beyond the end face of the outer shell. Such projection creates a socket 20b of a depth precisely equal to the extent of projection of the end portion 20a, whereupon contiguous conductor units are assembled in a male and female relationship, as shown in Figure 3. If desired, the faces of the projection 20a may be tapered to facilitate the insertion thereof into the socket 20b of the next succeeding unit.

Electrical interconnection of the conductors 22 of adjacent units may be effected by pins 24, 24, see Figure 3, which pass snugly into the tubular conductors 22. To improve the frictional engagement of the pins with the respective conductors 22, such pins may be bifurcated, see 26, Figure 6, affording resilient end portions, or made with knobs 28, 28, Fig. 7, at the ends thereof, said knobs being slightly larger in diameter than the internal diameter of the conductors 22.

To afford connection of an outlet plug with the electricity conductors of a unit, the stated conductors may be provided with spring contact means 30, 30, see Fig. 4, which spring contact means are housed within suitable pockets 32, 32, formed in the body material of insert section 20. In the embodiment illustrated in Fig. 4, it is to be noted that the spring contact means 32 terminate substantially at the surface of the insert section 20. Thus, such contact-provided insert section may be slidably inserted into the outer shell 10 until the contacts 32 thereof register with the openings 12 of such outer shell, it being understood that the stated spring contact means are so located as to bring them into registry with the openings 12 coincidentally with the proper projection of the end 20a beyond the end surface of such outer shell 10.

In the embodiment illustrated in Figure 8, the spring contacts 30 may extend substantially beyond the outer surface of the insert section 20. To permit such extension, and yet provide for the slidable insertion of insert 20 within the outer shell 10, the under side of such shell 10 may be provided with longitudinal grooves 34, 34, of suitable depth to accommodate the spring contacts without conflict.

Insert section 20 may be standardized by providing spring contact means at suitable intervals. Such contact provided sections 20, may obviously be slidably inserted either into an outlet-provided outer shell 10, as aforesaid, or into an imperforate or "blank" shell 10; in the latter circumstance, the spring contact means are nonoperative, and are in suitable electrically insulated status by reason of the insulation quality of the outer shell material, and the insulation quality of the core material.

Figure 2 illustrates such construction, and in such figure the position of the spring contacts 30 relative to the outer shell 10 is illustrated in dotted outline.

For the securement of the conductor units to a wall surface, baseboard, or the like, the units thereof may be provided with passages 40, through which, see Figs. 1 and 8, a wood screw 42 or equivalent may be passed. When soft rubber or the like is employed as the core material, it is necessary and desirable only to provide the facing and rear walls of the outer shell with such passages 40. The relatively soft nature of the core material provides for the ready passage of a wood screw therethrough, and as it is, therefore, not necessary to provide the stated inserts 20 with wood screw passages, it eliminates the problem of bringing the passages in the outer shell into registry with a passage through the core portion.

Whereas I have described my invention by reference to specific forms thereof, it will be understood that many changes and modifications may be made without departing from the spirit of the invention.

I claim:

An electricity conductor unit arranged for seriatim mechanical and electrical interconnection with like conductor units to form a wiring system, comprising the combination with a tubular outer casing of electrical insulation material having open ends and apertures through a wall adapted for the passage of the blades of an attachment plug, of a core member comprising a body of electrical insulation material having a length equal to the length of such outer casing and arranged for slidable insertion therein, a plurality of tubular electricity conductors coextensive with said core member positioned therein in fixed mutually insulated relationship, and contact means on said electricity conductors and having operating surfaces disposed within open topped pocket means formed in said body of insulation material, whereby such operating surfaces are isolated within said body of insulation material; the apertures in said casing wall being so positioned intermediate the ends thereof that upon slidably inserting said core member into said outer casing to a position whereby an end of said core member projects from said casing for a predetermined distance, the pocket means and the operating surfaces of the therein disposed contact means of such core member are in registry with the apertures of the outer casing to permit such attachment plug blades to engage the operating surfaces of such contact means.

LOUIS G. MORTEN.